(12) United States Patent
Gaigg et al.

(10) Patent No.: US 12,519,153 B2
(45) Date of Patent: Jan. 6, 2026

(54) ACCUMULATOR

(71) Applicant: Miba eMobility GmbH, Laakirchen (AT)

(72) Inventors: Stefan Gaigg, Gmunden (AT); Roland Hintringer, Linz (AT)

(73) Assignee: Miba eMobility GmbH, Laakirchen (AT)

( * ) Notice: Subject to any disclaimer, the term of this patent is extended or adjusted under 35 U.S.C. 154(b) by 503 days.

(21) Appl. No.: 16/638,932

(22) PCT Filed: Sep. 11, 2018

(86) PCT No.: PCT/AT2018/060204
§ 371 (c)(1),
(2) Date: Feb. 13, 2020

(87) PCT Pub. No.: WO2019/051519
PCT Pub. Date: Mar. 21, 2019

(65) Prior Publication Data
US 2020/0227798 A1    Jul. 16, 2020

(30) Foreign Application Priority Data

Sep. 14, 2017   (AT) .............................. A 50770/2017

(51) Int. Cl.
*H01M 10/63*   (2014.01)
*H01M 10/48*   (2006.01)
(Continued)

(52) U.S. Cl.
CPC .......... *H01M 10/63* (2015.04); *H01M 10/48* (2013.01); *H01M 10/482* (2013.01);
(Continued)

(58) Field of Classification Search
CPC .. H01M 10/63; H01M 10/613; H01M 10/625; H01M 10/647; H01M 10/6556;
(Continued)

(56) References Cited

U.S. PATENT DOCUMENTS 7,291,420 B2   11/2007 Bitsche et al.
8,852,772 B2   10/2014 Mcdonald
(Continued)

FOREIGN PATENT DOCUMENTS

CN           1745438 A      3/2006
CN         102834963 A    12/2012
(Continued)

OTHER PUBLICATIONS

International Search Report in PCT/AT2018/060205, mailed Feb. 4, 2019.
(Continued)

*Primary Examiner* — Lisa S Park
(74) *Attorney, Agent, or Firm* — Collard & Roe, P.C.

(57) ABSTRACT

The invention relates to a rechargeable battery (1) with at least one cell (3) for storing electrical energy and at least one cooling device (2) for cooling or controlling the temperature of the cell (3), wherein the cooling device (2) comprises at least one coolant channel (5). The cooling device (2) comprises at least one single-layer or multi-layer film (4, 9) with at least one sensor element (17).

10 Claims, 3 Drawing Sheets

(51) Int. Cl.
*H01M 10/613* (2014.01)
*H01M 10/625* (2014.01)
*H01M 10/647* (2014.01)
*H01M 10/6556* (2014.01)
*H01M 10/6568* (2014.01)

(52) U.S. Cl.
CPC ....... *H01M 10/486* (2013.01); *H01M 10/613* (2015.04); *H01M 10/625* (2015.04); *H01M 10/647* (2015.04); *H01M 10/6556* (2015.04); *H01M 10/6568* (2015.04); *H01M 2220/20* (2013.01)

(58) Field of Classification Search
CPC ............. H01M 10/6568; H01M 10/48; H01M 10/482; H01M 10/486; H01M 2220/20; Y02E 60/10
See application file for complete search history.

(56) References Cited

U.S. PATENT DOCUMENTS

| | | | |
|---|---|---|---|
| 8,889,282 | B2 | 11/2014 | Goesmann et al. |
| 8,962,172 | B2 | 2/2015 | Bolze et al. |
| 9,546,827 | B2 | 1/2017 | Ludwig et al. |
| 9,559,387 | B2 | 1/2017 | Obrist et al. |
| 9,871,276 | B2 | 1/2018 | Shaaia et al. |
| 2002/0177035 | A1 | 11/2002 | Oweis et al. |
| 2004/0004461 | A1* | 1/2004 | Hamada .............. H01M 10/625 320/112 |
| 2005/0089750 | A1* | 4/2005 | Ng ...................... H01M 10/647 429/62 |
| 2007/0037050 | A1 | 2/2007 | Rigobert et al. |
| 2008/0179315 | A1 | 7/2008 | Suzuki et al. |
| 2008/0311468 | A1 | 12/2008 | Hermann et al. |
| 2009/0246606 | A1 | 10/2009 | Shimizu |
| 2011/0304297 | A1 | 12/2011 | Sohn |
| 2012/0107635 | A1 | 5/2012 | Hirsch et al. |
| 2012/0231313 | A1 | 9/2012 | Kumar et al. |
| 2013/0052493 | A1 | 2/2013 | Schaefer et al. |
| 2013/0122331 | A1 | 5/2013 | Mcdonald |
| 2013/0177791 | A1 | 7/2013 | Takahashi et al. |
| 2015/0295287 | A1 | 10/2015 | Schnaars et al. |
| 2016/0233561 | A1* | 8/2016 | Lee ...................... H01M 50/20 |
| 2016/0233564 | A1 | 8/2016 | Rinker et al. |
| 2017/0104252 | A1 | 4/2017 | Wuensche et al. |
| 2017/0200926 | A1 | 7/2017 | Motokawa et al. |
| 2017/0338532 | A1 | 11/2017 | Mott et al. |
| 2018/0151929 | A1 | 5/2018 | Song et al. |
| 2018/0238632 | A1 | 8/2018 | Jia et al. |

FOREIGN PATENT DOCUMENTS

| | | | |
|---|---|---|---|
| CN | 102881959 | A | 1/2013 |
| CN | 104977952 | A | 10/2015 |
| CN | 105375083 | A | 3/2016 |
| CN | 206 353 596 | U | 7/2017 |
| DE | 9012327 | U1 | 11/1990 |
| DE | 100 34 134 | A1 | 1/2002 |
| DE | 10 2008 053 311 | A1 | 4/2009 |
| DE | 10 2008 034 867 | A1 | 1/2010 |
| DE | 10 2008 059 970 | A1 | 6/2010 |
| DE | 10 2010 032 460 | A1 | 2/2012 |
| DE | 10 2011 075 820 | A1 | 11/2012 |
| DE | 10 2011 118 686 | A1 | 5/2013 |
| DE | 10 2013 220 044 | A1 | 4/2015 |
| DE | 10 2013 221 747 | A1 | 4/2015 |
| DE | 102103220044 | | * 4/2015 |
| DE | 10 2013 021 553 | A1 | 6/2015 |
| DE | 10 2015 101 931 | A1 | 8/2016 |
| DE | 10 2015 204 678 | A1 | 9/2016 |
| EP | 1 261 065 | A2 | 11/2002 |
| EP | 2 451 004 | A1 | 5/2012 |
| EP | 2 744 033 | A1 | 6/2014 |
| EP | 3168032 | A1 | 5/2017 |
| FR | 2 782 399 | A1 | 2/2000 |
| FR | 3013515 | A1 | 5/2015 |
| JP | 2006-271063 | A | 10/2006 |
| JP | 2009054303 | A | 3/2009 |
| JP | 2014-078471 | A | 5/2014 |
| JP | 2014078471 | | * 5/2014 |
| WO | 2007125021 | A2 | 11/2007 |
| WO | 2010/012341 | A1 | 2/2010 |
| WO | 2010/108885 | A1 | 9/2010 |
| WO | 2011/088997 | A1 | 7/2011 |
| WO | 2012/062644 | A1 | 5/2012 |
| WO | 2012/072348 | A1 | 6/2012 |
| WO | 2014082701 | A1 | 6/2014 |
| WO | 2017/015826 | A1 | 2/2017 |
| WO | WO2017108581 | | * 6/2017 |

OTHER PUBLICATIONS

International Search Report in PCT/AT2018/060190, mailed Nov. 29, 2018.

International Search Report in PCT/AT2018/060204, mailed Feb. 4, 2019.

* cited by examiner

ACCUMULATOR

CROSS REFERENCE TO RELATED APPLICATIONS

This application is the National Stage of PCT/AT2018/060204 filed on Sep. 11, 2018, which claims priority under 35 U.S.C. § 119 of Austrian Application No. A 50770/2017 filed on Sep. 14, 2017, the disclosure of which is incorporated by reference. The international application under PCT article 21(2) was not published in English.

BACKGROUND OF THE INVENTION

1. Field of the Invention

The invention relates to a rechargeable battery with at least one cell for storing electrical energy and at least one cooling device for cooling or controlling the temperature of the cell, wherein the cooling device comprises at least one coolant channel.

2. Description of the Related Art

The service life and effectiveness as well as the safety of a rechargeable battery, i.e. of an accumulator, for e-mobility depend, among other factors, on the temperature during operation. Temperatures that are too high can endanger the rechargeable battery and the drive in electric and hybrid vehicles. For this reason, various concepts have been suggested for the cooling and/or temperature control of the rechargeable batteries. These concepts can be divided into essentially two types, namely air cooling and water cooling and/or in general cooling with liquids. For observing the heat development, NTC temperature sensors are known in the art, for example by EPCOS AG (https://de.tdk.eu/tdk-de/190976/tech-library/artikel/applications---cases/applications---cases/bodyguards-fuer-batterie-und-antrieb/190330).

SUMMARY OF THE INVENTION

The present invention is based on the object of creating a structurally simple possibility for observing at least one operating parameter of a rechargeable battery.

In the aforementioned rechargeable battery, the object of the invention is achieved in that the cooling device comprises at least one single-layer or multi-layer film with at least one sensor element.

The advantage of this is that by the combination "film" with "sensor element", the temperature sensor can better rest against the cells, since the film can more easily balance tolerances of the cells. The film can, without further measures (such as the application of leveling compounds) having to be implemented, lie against the cells with a larger surface, which thus allows for a more efficient measurement of the operating parameter. Moreover, a weight reduction can be achieved by means of the film such that the weight increase caused by the additional sensor technology can be partially compensated for.

Where, below, for the purpose of simplification merely the term "cooling" is used, the term "temperature control" should be read as well. Temperature control of the rechargeable battery is also covered by the term "cooling" within the meaning of the invention.

According to an embodiment variant of the rechargeable battery, it can be provided for that the single-layer or multi-layer film comprises a separate sensor element for each cell, whereby it can easily be allowed for that each cell can be detected individually.

According to another embodiment variant of the rechargeable battery the at least one sensor element is preferably arranged on or in the single-layer or multi-layer film, whereby the structure of the rechargeable battery can be further simplified. Moreover, hence, the aforementioned effects can better be realized.

In the preferred embodiment variant of the rechargeable battery, the at least one sensor element is a thin layer sensor element. On the one hand, by means of thin film technology the arrangement of at least one sensor element on the film can be simplified. On the other hand, hence the sensor element can also be provided with a certain flexibility such that the sensor element can better follow movements of the film.

In a further preferred embodiment variant of the rechargeable battery, the at least one sensor element is a temperature sensor or a pressure sensor or a humidity sensor or a leak sensor or a pressure-drop sensor, since such sensor elements can easily be integrated into the system.

It can also be provided for that, according to another embodiment variant of the rechargeable battery, the at least one sensor element is formed by a coating of the single-layer or multi-layer film, whereby the application of the sensor element can be simplified. Moreover, hence, the aforementioned effects regarding the flexibility of the sensor element can be achieved more easily.

According to another preferred embodiment variant of the rechargeable battery, the at least one sensor element is contacted so as to be electrically conductive by means of conducting paths, whereby the provision of the film with the sensor element can be further simplified.

It can be provided for that the at least one sensor element rests directly against one of the cells, whereby the immediacy of the measurement value can be improved. Moreover, it is hence possible that the cooling device first goes through all essential manufacturing steps before the sensor element is formed. Hence, the sensor element can better be protected from damage in the manufacturing phase.

However, according to another embodiment variant of the rechargeable battery, it can also be provided for that the multi-layer film comprises at least two plastic films and that the at least one sensor element is arranged between these two plastic films. The sensor arrangement can hence be designed to be more robust since it can be better protected from environmental impacts.

For the same reason, it can be provided for that the multi-layer film further comprises a metal film, wherein the metal film is arranged on the surface of the multi-layer film facing away from the cells. Moreover, hence, in particular the temperature can be measured more independently of environmental influences, as by means of the film a heat dissipation of heat not originating from the cells can be carried out.

It can also be provided for that the at least one sensor element is connected to an open loop and/or closed loop control element, and that the volume per time unit of coolant flowing through the coolant channel is controlled depending on the measured temperature, whereby the efficiency of the rechargeable battery can be increased in that it is operated at least essentially on the corresponding temperature level.

BRIEF DESCRIPTION OF THE DRAWINGS

For the purpose of better understanding of the invention, it will be elucidated in more detail by means of the figures below.

These respectively show in a simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
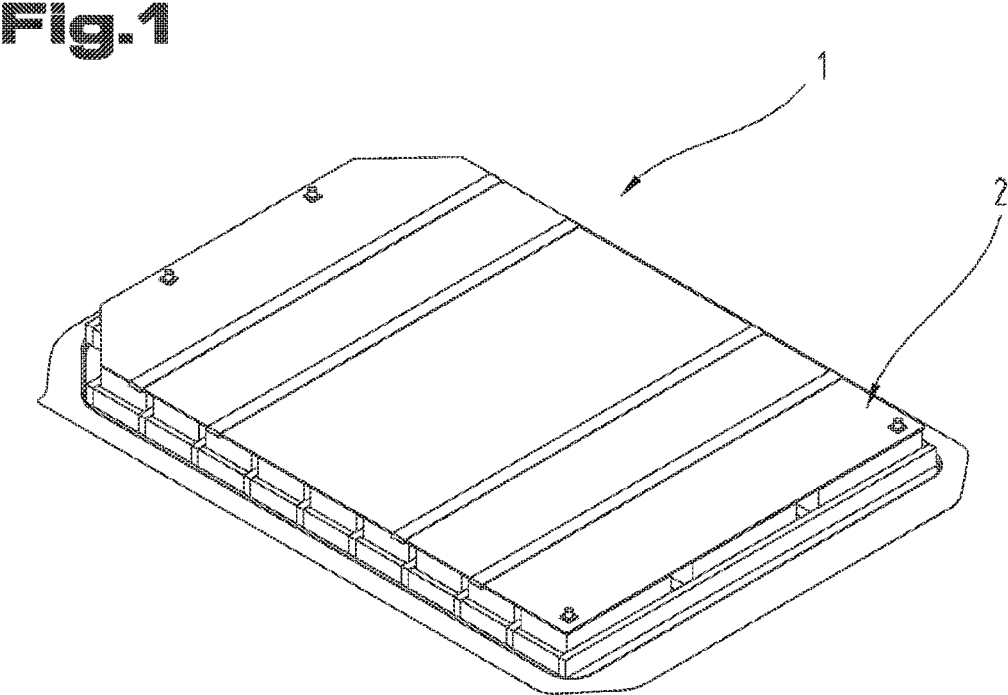
FIG. 1 a rechargeable battery in an oblique view with a cooling device.
Figure 2:
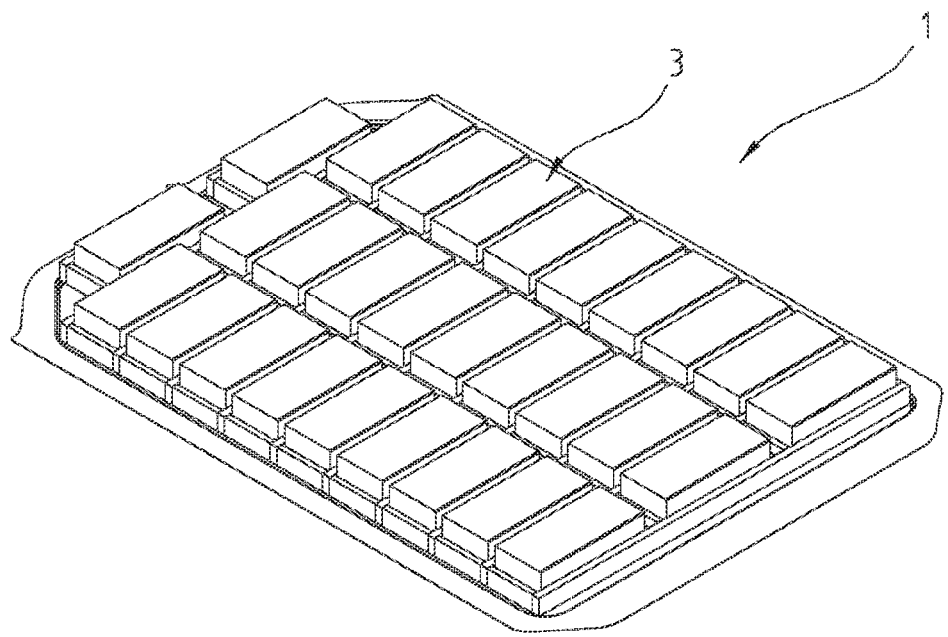
FIG. 2 the rechargeable battery according to FIG. 1 in an oblique view without the cooling device.

FIGS. 1 and 2 show a rechargeable battery 1, i.e. an accumulator, in an oblique view, with FIG. 1 showing the rechargeable battery 1 with a cooling device 2 and FIG. 2 showing the rechargeable battery 1 without this cooling device 2.

The rechargeable battery 1 comprises several cells 3 for electrical energy. In the represented example there are 27 cells 3. However, this number is not to be considered restricting.

The cells 3 can be formed to be cuboid, cube-shaped, cylindrical, etc.

As the basic construction of such rechargeable batteries 1 for e-mobility is known from the prior art, reference is made thereto so as to avoid repetitions.

As can be seen from the comparison of the two FIGS. 1 and 2, the cooling device 2 is arranged on a side of the rechargeable battery 1, in particular on the top. However, it can also be provided for that the cooling device 2 extends across at least two surfaces of the rechargeable battery 1, for example on the top and laterally and optionally on the bottom. In the alternative or in addition to this, the cooling device 2 can also be arranged between the cells 3.

It is preferred if the cooling device 2 extends across all cells 3, in particular the upper side of the cells 3, (as can be seen from FIG. 1) such that all cells 3 can be cooled by means of just one cooling device 2. However, in general, it is also possible to provide several cooling devices 2 in the rechargeable battery 1, for example two or three or four, such that for example the cells 3 are distributed to two or three or four, etc. cooling devices 2.

Reference is made to the fact that the terms upper side etc. refer to the installation position of the rechargeable battery 1.

Further reference is made to the fact that the cells 3 can be formed modularly such that these can also be referred to as storage modules.

Moreover, reference is made to the fact that in the present description, the rechargeable battery 1 is described with several cells 3. However, the rechargeable battery 1 can also comprise merely one cell 3 such that the statements in the description can be correspondingly applied to this embodiment variant.

Figure 3:
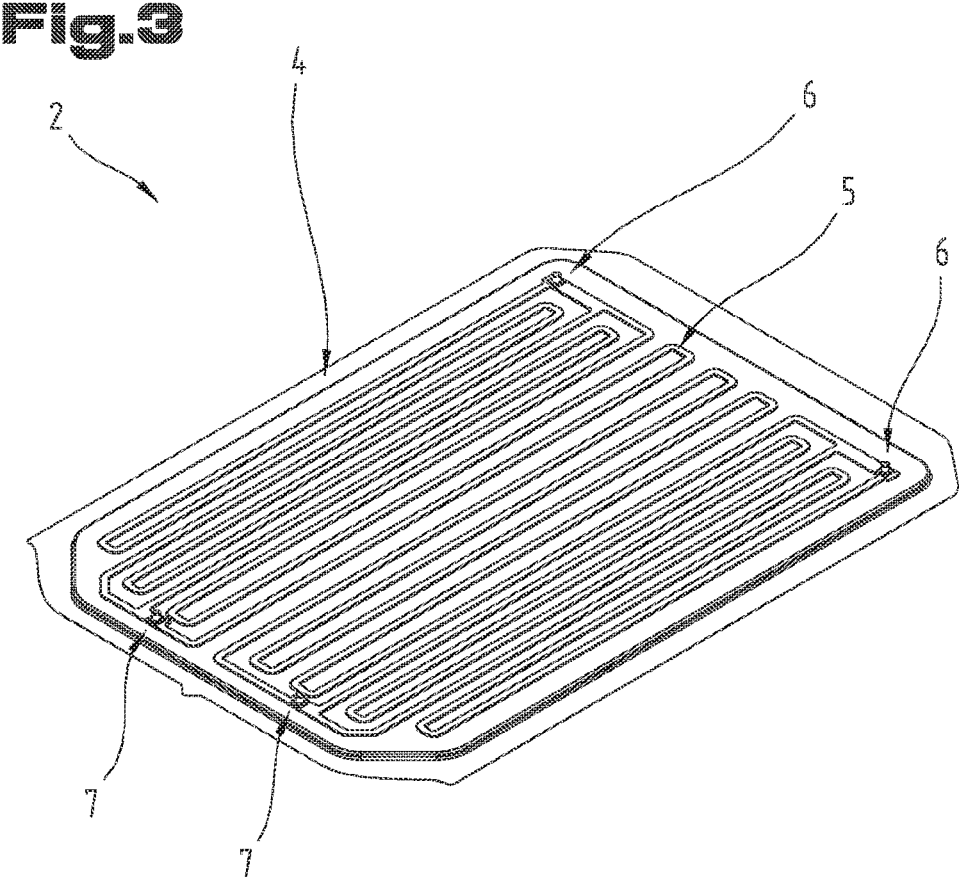
FIG. 3 a cutout from the cooling device.
Figure 4:
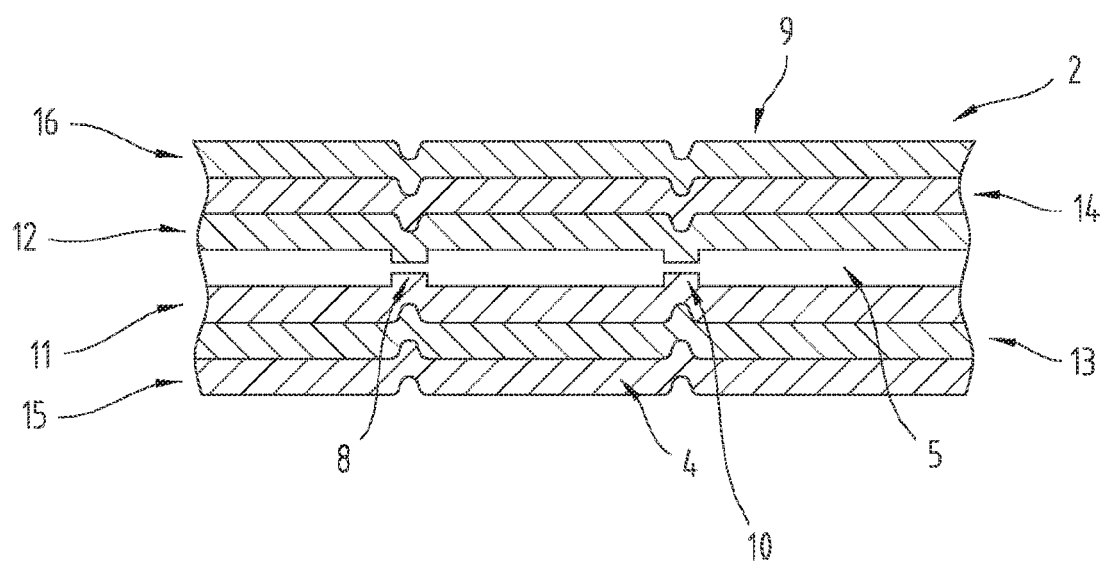
FIG. 4 a cutout from the cooling device.

In all embodiment variants, the cooling device 2 comprises a single-layer or multi-layer film 4 or consists thereof, as can be seen from FIGS. 3 and 4. By means of this film 4, the cooling device 2, in particular directly, lies against cells 3. The contact is for example established at the upper side of the cells 3, as was elucidated above. As the film 4 is flexible, i.e. not stiff, said film 4 can better adapt to surface irregularities of the cells 3 or between the cells 3. A leveling compound between the cooling device 2 and the cells 3 is not required.

The cooling device 2 can comprise the and/or a single-layer or multi-layer film 4 on both sides. However, it is also possible that the single-layer or multi-layer film 4 is arranged merely on the side of the cooling device 2 that faces the cells 3, and that this film 4 is combined with a stiff metal layer, for example of aluminum and/or an aluminum alloy, which can also form a cover of the rechargeable battery 1.

Moreover, the cooling device 2 comprises at least one coolant channel 5, which extends from at least one inlet 6 to at least one outlet 7. The at least one coolant channel 2 is formed within the single-layer or multi-layer film 4 or between two single-layer or multi-layer films 4 or between this film 4 and the metal layer by a just partial connection of the film(s) 4 or of the film 4 to the metal layer. For example, the at least one coolant channel 5 can be produced by bonding or welding of the film(s) 4 forming webs 8 (FIG. 4). In this regard, the at least one coolant channel 5 emerges in the non-connected regions of the film(s) 4 next to the webs 8. Other suitable connecting techniques can also be used for connecting the film(s) 4 or the film 4 to the metal layer. In general, the connecting techniques are preferably selected such that no additional measures need to be taken to obtain a liquid-tight design of the connection.

The at least one coolant channel 5 can also be produced differently. For example, the metal layer can be reformed, e.g. deep-drawn, accordingly.

The coolant channel 5 can be formed to extend in a meandering manner in the cooling device 2, as can be seen from FIG. 3. The concrete representation of the extent of the at least one coolant channel 5 in FIG. 3 is to be understood merely as an example. The respectively optimized extent of the at least one coolant channel 5 is among other factors determined by the amount of heat that needs to be conducted away, the geometry of the rechargeable battery 1, etc. It can also be provided for that more than one coolant channel 5 is formed and/or arranged in the cooling device 2. In this case, it is advantageous if a common inlet 6 is arranged in front of the several coolant channels 5 and a common outlet 7 behind them, which can each be formed as collecting channels, from which the coolant channels 5 branch out or into which they flow. However, it is also possible that each coolant channel 5 has its own inlet 6 and/or its own outlet 7.

In particular, a liquid such as a water-glycol mixture is used as the coolant by which the cooling device 2 is flown through.

The cooling device 2 according to FIG. 4 comprises the film 4 and a further single-layer or multi-layer film 9. The film 4 and the further film 9 are connected to one another in connection areas 10 forming the at least one coolant channel 5 between the film 4 and the further film 9. The connection areas 10 extend along the longitudinal extent of the at least one coolant channel 5, wherein between the connection areas 10 non-connected areas remain in which the at least one coolant channel 5 is formed by the distancing of the film 4 with respect to the further film 9. The film 4 and the further film 9, which is in particular arranged above the film 4, extend across a surface which preferably at least approximately, in particular to 100%, corresponds to the surface of the cooling device 2 (as viewed in a plan view).

The film 4 and the further film 9 can consist of a laminate comprising a first plastic film 11, 12, an enforcement layer 13, 14 connected thereto, a metal film 15 and/or 16 connected to the enforcement layer 13 and/or 14 or a metalized further plastic film connected to the enforcement layer 13. However, it should be noted that in particular the film 4 resting against the cells 3 can also be formed from the plastic film 1 as a single layer.

In general, other laminates can be used as well. For example, merely the film 4 can be provided with the metal film 15 or merely the further film 9 can be provided with the metal film 16. Likewise, merely the film 4 can comprise the enforcement layer 13 or merely the further film 9 can comprise the enforcement layer 14. Likewise, structures of the film 4 and/or the further film 9 with more than three layers are possible. However, preferably, the film 4 and the further film 9 are designed equally.

The at least one coolant channel 5 is not formed by separate components but by the just partial connection of the film 4 to the further film 9. The wall and/or the walls of the at least one coolant channel 5 are thus formed by the film 4 and the further film 9, preferably half by each.

The first plastic films 11, 12 and/or the metalized further plastic film preferably consists/consist to at least 80 wt. %, in particular at least 90 wt. %, of a thermoplastic material or of an elastomer. The thermoplastic material can be selected from a group comprising and/or consisting of polyethylene (PE), polyoxymethylene (POM), polyamide (PA), in particular PA 6, PA 66, PA 11, PA 12, PA 610, PA 612, polyphenylene sulphide (PPS), polyethylene terephthalate (PET), crosslinked polyolefins, preferably polypropylene (PP). The elastomer can be selected from a group comprising and/or consisting of thermoplastic elastomers such as thermoplastic vulcanizates, olefin-, amine-, ester-based thermoplastic polyurethanes, in particular ether-based/ester-based thermoplastic elastomers, styrene block copolymers, silicone elastomers.

At this point, it should be noted that the term plastic material is understood as a synthetic or natural polymer produced from corresponding monomers.

Preferably, the first plastic film 11, 12 and/or the metalized further plastic film consists/consist of a so-called sealing film. This has the advantage that the respective films can be connected to one another directly.

However, it is also possible to use other plastic materials, such as thermosetting plastic materials and/or thermosetting materials, which are then for example adhered to one another by means of an adhesive. Two-part adhesive systems based on polyurethane or silicone or hot melt adhesive systems are particularly suitable for this purpose.

Preferably, the enforcement layer/enforcement layers 13, 14 comprise/comprises a or consist/consists of a fiber reinforcement which is preferably formed as a separate layer. The fiber reinforcement can be formed of fibers and/or threads, which are selected from a group comprising or consisting of glass fibers, aramid fibers, carbon fibers, mineral fibers such as basalt fibers, natural fibers such as hemp, sisal and combinations thereof.

Preferably, glass fibers are used as fiber reinforcement. The proportion of the fibers, in particular the glass fibers, in the fiber reinforcement can amount to at least 80 wt. %, in particular at least 90 wt. %. Preferably, the fibers and/or threads of the fiber reinforcement consist merely of glass fibers.

The fibers and/or threads can be present in the fiber reinforcement as roving, for example as a non-woven fabric. However, preferably the fibers and/or threads become a woven fabric or a knitted fabric. In this regard, it is also possible that the woven or knitted fabric is merely present in some regions and that the remaining regions of the fiber reinforcement are formed by a roving.

It is also possible that rubberized fibers and/or threads are used as or for the fiber reinforcement.

When using a woven fabric, different types of weaves are possible, in particular plain, twill or satin weave. Preferably, a plain weave is used.

However, it is also possible to use an open-mesh glass fabric or glass roving.

Coated paper can also be used as fiber reinforcement. The paper is equipped to be resistant to liquids by the coating.

In the alternative or in addition to the fiber reinforcement, the enforcement layer(s) 13, 14 can comprise a mineral filling. For example, calcium carbonate, talc, quartz, wollastonite, kaolin or mica can be used as a mineral filling (mineral filler material).

The metal film 15, 16 in particular is an aluminum film. However, other materials such as copper or silver can also be used.

The metal film 15, 16 can have a layer thickness of between 5 μm and 100 μm.

The plastic films 11, 12 can have a layer thickness of between 10 μm and 200 μm.

The layer thickness of the enforcement layer(s) 13, 14 can amount to between 5 μm and 50 μm.

Although the films 4, 9 can in general be used in the form of individual films for producing the cooling device 2, such that the film laminate(s) are only formed in the course of the production of the cooling device 2, it is advantageous if the films 4, 9 are used as a (laminated) semi-finished product.

For connecting the individual layers of the laminate or the laminates, these can be adhered to one another by means of adhesives. The afore-mentioned adhesives are suitable for this purpose. Besides adhesives, coextrusion and extrusion coating can also be used as joining options. Of course, a combination is also possible in which several plastic materials are coextruded and adhesively laminated to one another with an extrusion-coated metal or (fiber) enforcement layer. In general, all known methods can be used for producing composite films and/or film laminates.

The cooling device 2 can also comprise a further single-layer or multi-layer film, whereby coolant channels 5 can be formed in several planes.

Figure 5:
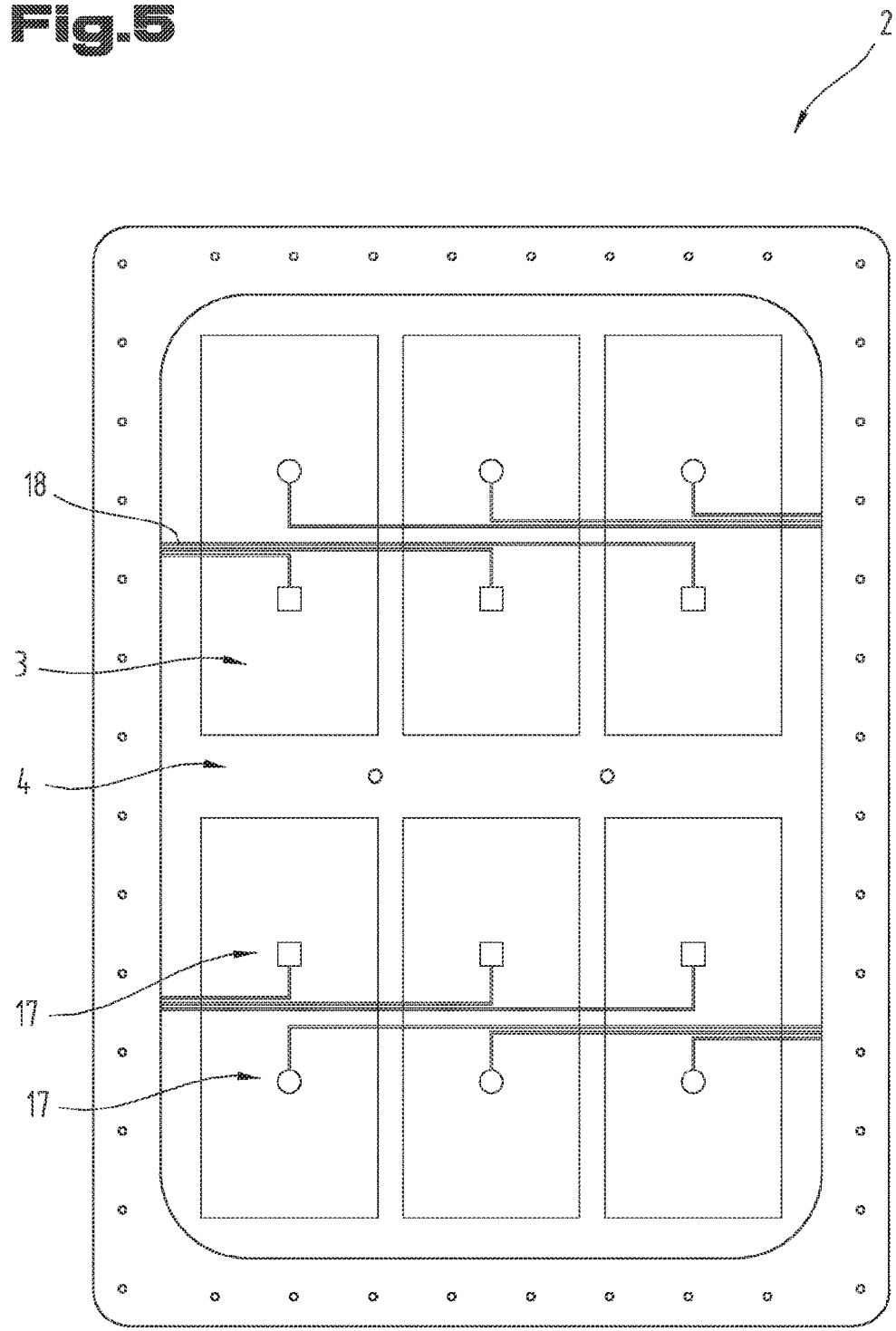
FIG. 5 a cooling device with arranged sensor elements.

In FIG. 5, the cooling device 2 is shown in an oblique view from below onto the single-layer or multi-layer film 4. As can be seen from the representation, the single-layer or multi-layer film 4 comprises at least one sensor element 17. Preferably, at least one sensor element 17 is assigned to each cell 3 (adumbrated in FIG. 5).

In general, the sensor element 17 can have any desired shape and be arranged at any suitable position of the cooling device 2. However, for the reasons described above, in the preferred embodiment variant, the at least one sensor element 17 is arranged on or in the single-layer or multi-layer film 4. If it is arranged in the film 4, it can be arranged between two of the layers of the laminate of the film mentioned above. However, it is also possible that the at least one sensor element 17 is arranged merely within one layer of the laminate. For this purpose, the sensor element 17 can already be provided during the formation of the layer and be enclosed by and/or embedded in the material of this layer.

"Arranged on the film" means that the at least one sensor element 17 is arranged on an outside, i.e. on an outer surface, of the single-layer or multi-layer film 4.

It is further preferred for the at least one sensor element 17 to be a thin layer sensor element. Thin film technology is per se known from the relevant literature, such that reference is made thereto regarding details.

It is also possible that the sensor element 17 is applied on the single-layer or multi-layer film 4 as a (partial) coating. The coating can in particular be applied by means of a printing process (e.g. screen printing, web-fed printing, ink jet printing, engraving, gravure printing, flat printing, stamp printing), by spraying, vapor deposition, plasma coating, sputtering, powder coating, etc.

Moreover, it is possible that the at least one sensor element 17 is contacted by wire. However, the electrical contact of the at least one sensor element 17 by means of at least one conducting path 18, as can be seen from FIG. 5, is preferred. The conducting path 18 is in particular arranged on the same surface of the single-layer or multi-layer film 4, 9 on which the at least sensor element 17 is arranged as well.

Moreover, the at least one conducting path 18 is preferably applied by means of thin film technology or by means of a coating method. In this regard, reference is made to the corresponding explanations above regarding the sensor element 17.

In this regard, it is also advantageous if the conducting paths 18 of the sensor elements 17 are only routed to the outside on one side of the cooling device 2 for contacting, as this makes contacting easier. Optionally, in particular if two different sensor elements 17 are used, the outward contacting can be established on different sides to allow for a separation if the two sensor elements 17, as shown in FIG. 5 (the two different sensor elements 17 are adumbrated by a circle and a square).

In this regard, it can be advantageous if the at least one inlet 6 and the at least one outlet 7 or in general all outlets 6 and all inlets 7 of the at least one coolant channel 5 are arranged or formed in the region of a side or of the sides of the cooling device 2 in which no contacting of the at least one sensor element 17 is provided (for example the two short sides in the embodiment variant of the cooling device 2 according to FIG. 5).

If the at least one sensor element 17 is arranged on an outer side of the single-layer or multi-layer film 4, this is preferably the surface of the film 4 with which it rests against the cells 3, so that the at least one sensor element 17 also rests directly against the at least one cell 3.

As elucidated above, the single-layer or multi-layer film 4 can also comprise a metal film or a metalized plastic film. In this case, it is advantageous if the metal film or the metalized plastic film is arranged on the surface of the multi-layer film 4 facing away from the cells 3. In this regard, it is advantageous if the cooling device comprises the two films 4, 9 and merely the film 9 is provided with the metal film 16 and/or the metalized plastic film.

The sensor element 17 can be formed as desired. In the preferred embodiment variant of the cooling device 2, however, at least one temperature sensor (circle in FIG. 5) and/or at least one pressure sensor (square in FIG. 5) is used.

The at least one temperature sensor can for example be a thermocouple or a thermistor. In general, other suitable temperature sensors can be used as well.

The temperature sensor can comprise a negative temperature coefficient thermistor (NTC) or a positive temperature coefficient thermistor (PTC).

A piezoelectric sensor, a piezoresistive sensor, a capacitive pressure sensor, etc. can be used as force or pressure sensor.

The sensor element 17 can also be a humidity sensor or a leak sensor or a pressure-drop sensor.

Since the sensors per se are known from measurement technology, these and the underlying measurement principles are not explained in further detail.

It is, moreover, possible that the at least one sensor element 17 is connected to an open loop and/or a closed loop control element, and that the volume per time unit of coolant flowing through the coolant channel 5 is controlled depending on the measured temperature. For this purpose, the rechargeable battery 1 can comprise a corresponding open loop and/or closed loop controller and/or such an open loop and/or closed loop controller can be assigned to the rechargeable battery 1.

In the preferred embodiment variant, the cooling device 2 is used for cooling and/or controlling the temperature of a rechargeable battery 1. However, other uses of the cooling device 2, such as power electronics cooling, stationary rechargeable batteries, industrial plant cooling of surfaces, etc., are also possible. The cooling device 2 can thus represent a separate invention on its own, i.e. without the cells 3 and the rechargeable battery 1. Therefore, the statements regarding the cooling device 2 made above also apply to this separate invention.

The exemplary embodiments show and/or describe possible embodiment variants, while combinations of the individual embodiment variants are also possible.

Finally, as a matter of form, it should be noted that for ease of understanding of the structure of the rechargeable battery 1 and/or of the cooling device 2, these are not obligatorily depicted to scale.

LIST OF REFERENCE NUMBERS 1 rechargeable battery
2 cooling device
3 cell
4 film
5 coolant channel
6 inlet
7 outlet
8 web
9 film
10 connection area
11 plastic film
12 plastic film
13 enforcement layer
14 enforcement layer
15 metal film
16 metal film
17 sensor element
18 conducting path

The invention claimed is:

1. A rechargeable battery having
at least one cell for storing electrical energy and
at least one cooling device for cooling or controlling the temperature of the cell,
wherein the cooling device comprises at least one coolant channel,
wherein the cooling device comprises at least one multi-layer film with at least one sensor element or two multi-layer films with at least one sensor element,
wherein the at least one sensor element is formed by a coating of the multi-layer film, wherein the at least one multi-layer film is a laminate or the two multi-layer films are laminates, wherein the laminate comprises or the laminates comprise:

(1) a first plastic film, an enforcement layer connected thereto, and a metal film connected to the enforcement layer, wherein the enforcement layer is arranged between the first plastic film and the metal film, and wherein the metal film has a thickness of between 5 μm and 100 μm, or (2) a first plastic film, an enforcement layer connected thereto, and a metalized further plastic film connected to the enforcement layer, wherein the enforcement layer is arranged between the first plastic film and the metalized further plastic film; and wherein the at least one coolant channel is formed a) between the two multi-layer films by a partial connection of the two multi-layer films, wherein the metal film of a first multi-layer film of the two multi-layer films extends below the at least one coolant channel and the metal film of a second multi-layer film of the two multi-layer films extends above the at least one coolant channel and the first plastic films of the two multi-layer films are directly connected to one another, or b) between the at least one multi-layer film and a metal layer by a partial connection of the at least one multi-layer film to the metal layer, wherein the metal film of the at least one multi-layer film extends below the at least one coolant channel.

2. The rechargeable battery according to claim 1, wherein the multi-layer film comprises at least one separate sensor element for each cell.

3. The rechargeable battery according to claim 1, wherein the at least one sensor element is a thin layer sensor element.

4. The rechargeable battery according to claim 1, wherein the at least one sensor element is a temperature sensor or a pressure sensor or a humidity sensor or a leak sensor or a pressure-drop sensor.

5. The rechargeable battery according to claim 1, wherein the at least one sensor element is contacted so as to be electrically conductive by means of at least one conducting path.

6. The rechargeable battery according to claim 1, wherein the at least one sensor element rests directly against one of the cells.

7. The rechargeable battery according to claim 1, wherein the metal film of the at least one multi-layer film is arranged on the surface of the multi-layer film facing away from the cells.

8. The rechargeable battery according to claim 1,
wherein the at least one sensor element is connected to an open loop and/or a closed loop control element, and
wherein the volume per time unit of coolant flowing through the coolant channel is controlled depending on the measured temperature.

9. The rechargeable battery according to claim 1, wherein the coating is one of a printed coating, a sprayed coating, a vapor deposition coating, a plasma coating, a sputtering coating, and a powder coating.

10. The rechargeable battery according to claim 9, wherein the printed coating is one of a screen-printing coating, a web-fed printing coating, an ink jet printing coating, an engraving coating, a gravure printing coating, a flat printing coating, and a stamp printing coating.

* * * * *